(12) United States Patent
Axelrod et al.

(10) Patent No.: US 8,677,943 B2
(45) Date of Patent: Mar. 25, 2014

(54) ANIMAL CHEW FORMED OF INTERWOVEN STRIPS OF EDIBLE RESIN

(75) Inventors: Glen S. Axelrod, Colts Neck, NJ (US); Nancy S. Rivadeneira, Union, NJ (US); Ajay Gajria, Maharashtra (IN)

(73) Assignee: T.F.H. Publications, Inc., Neptune City, NJ (US)

( * ) Notice: Subject to any disclaimer, the term of this patent is extended or adjusted under 35 U.S.C. 154(b) by 38 days.

(21) Appl. No.: 13/545,408

(22) Filed: Jul. 10, 2012

(65) Prior Publication Data

US 2012/0301586 A1 Nov. 29, 2012

Related U.S. Application Data

(62) Division of application No. 12/785,045, filed on May 21, 2010, now Pat. No. 8,215,267.

(51) Int. Cl.
*A01K 29/00* (2006.01)

(52) U.S. Cl.
USPC .......................................... 119/710; 119/709

(58) Field of Classification Search
USPC ........... 119/702, 707–711; D1/125, 199, 120; 426/104, 92, 132, 805; D30/160
See application file for complete search history.

(56) References Cited

U.S. PATENT DOCUMENTS

| 1,149,170 | A | | 8/1915 | Allis | |
|---|---|---|---|---|---|
| 3,796,812 | A | | 3/1974 | Baensch | |
| 4,702,929 | A | * | 10/1987 | Lehn et al. | 426/635 |
| 4,879,126 | A | * | 11/1989 | Willard et al. | 426/272 |
| 5,711,254 | A | | 1/1998 | O'Rourke | |
| D428,236 | S | * | 7/2000 | Jorg | D1/125 |
| 6,099,886 | A | * | 8/2000 | Takemori et al. | 426/515 |
| 6,186,096 | B1 | | 2/2001 | Miller | |
| 6,238,715 | B1 | | 5/2001 | Baikie | |
| 6,277,420 | B1 | | 8/2001 | Andersen et al. | |
| D496,772 | S | * | 10/2004 | Tepper et al. | D1/199 |
| D497,237 | S | * | 10/2004 | Tepper et al. | D1/120 |
| D497,701 | S | * | 11/2004 | Tepper et al. | D1/120 |
| 7,107,938 | B2 | | 9/2006 | Brown | |
| 7,147,888 | B2 | | 12/2006 | Brown et al. | |
| 7,677,203 | B2 | * | 3/2010 | Stern | 119/709 |
| 7,691,426 | B2 | * | 4/2010 | Axelrod et al. | 426/132 |
| 2005/0147719 | A1 | | 7/2005 | Hill et al. | |
| 2007/0186352 | A1 | | 8/2007 | Zhang | |
| 2007/0193531 | A1 | * | 8/2007 | Anderson et al. | 119/709 |
| 2007/0289552 | A1 | * | 12/2007 | Axelrod et al. | 119/710 |
| 2008/0185746 | A1 | | 8/2008 | Axelrod et al. | |
| 2009/0007854 | A1 | * | 1/2009 | Cooper | 119/707 |
| 2010/0095901 | A1 | * | 4/2010 | Cooper | 119/707 |

\* cited by examiner

*Primary Examiner* — Kristen C Hayes
(74) *Attorney, Agent, or Firm* — Grossman, Tucker, Perreault & Pfleger, PLLC

(57) ABSTRACT

A woven chew toy for animals is provided including one or more of edible resins, such as rawhide, meat jerky, starch and combinations thereof in strip form interwoven together to provide a planar article.

7 Claims, 2 Drawing Sheets

ANIMAL CHEW FORMED OF INTERWOVEN STRIPS OF EDIBLE RESIN

CROSS-REFERENCE TO RELATED APPLICATION

This application is a divisional application of U.S. application Ser. No. 12/785,045 filed May 21, 2010 and will issue on Jul. 10, 2012 as U.S. Pat. No. 8,215,267.

FIELD

The present disclosure relates to chew toys and a method of making thereof which incorporate an edible resin by interweaving to form a planar article. The chew toy may also be enriched with vitamins, minerals and/or herb additives to facilitate the delivery of such ingredients to the animal through the chewing process. In particular, the edible resin may include a starch based resin or a gluten-based resin and/or meat jerky and/or rawhide. The edible resin and/or meat jerky may be interwoven with strips of rawhide to form a chew toy in the described molding process.

BACKGROUND

It is well recognized that animals, such as dogs, have a natural desire to chew. Chewing may provide a number of benefits, including cleaning action for teeth and exercise for gums. Chewing may also reduce the bacteria that may be present in an animal's mouth which may aid in reducing infections, kidney disease or heart disease. In addition, plaque and calculus, which are mineralized deposits of plaque formed on the tooth surface, may be reduced by the abrasive action of chewing. Furthermore, by reducing bacteria, plaque and calculus, gum disease may be decreased, reducing the incidence of bad breath.

A variety of pet chews have been developed to help satisfy the chewing needs of animals. Pet chews have also been developed that may supply vitamins and nutrients to pets, augmenting healthy feeding regimes. These chews may range in size, shape, materials and color. However, there is still a need to provide pet chews that satisfy both the chewing requirements of a pet and augment nutritional feeding regimes.

SUMMARY

A chew toy for an animal, comprising a plurality of strips of one or more edible resins which are interwoven into a planar article, wherein a first plurality of strips are disposed in parallel fashion in a first plane and are intersected by a second plurality of strips disposed in parallel fashion in a second plane and wherein said one or more of said first plurality of strips passes alternately over and under one or more of said second plurality of strips to form said article.

In method form, the present disclosure is directed at a method of making a chew toy of interwoven strips of one or more of edible resins, comprising providing a first edible resin material and a second edible resin material, providing at least a first extruder and a second extruder, each of said first and second extruders having a plurality of dies. This may be followed by charging the first material into the first extruder and the second material into the second extruder and extruding the first material through the first plurality of dies and extruding the second material through the second plurality of dies to form a first plurality of extrudates and a second plurality of extrudates. The first plurality of extrudates are then configured in parallel fashion to each other and the second plurality of extrudates are configured in parallel to each other and the first plurality of extrudates are disposed normal to the second plurality of extrudates and the first plurality of extrudates are passed through said second plurality of extrudates in alternating fashion wherein one or more of said first plurality of extrudates passes first over and then under the one or more of said second plurality of extrudates to form a weave pattern.

BRIEF DESCRIPTION OF THE DRAWINGS

Features and advantages of the present disclosure are set forth herein by description of embodiments consistent with the present disclosure, which description should be considered in conjunction with the accompanying drawings, wherein.

DETAILED DESCRIPTION

Figure 1:
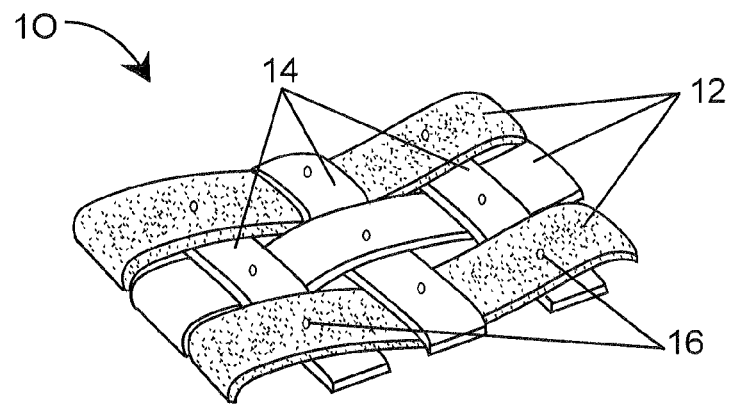
FIG. 1 is an exemplary embodiment of a first interwoven pet chew according to the present disclosure.

Still other objects and advantages of the present disclosure will become readily apparent to those skilled in the art from the following detailed description, wherein it is shown and described preferred embodiments of the disclosure. As will be realized the disclosure is capable of other and different embodiments, and its several details are capable of modification in various respects, without departing from the disclosure. Accordingly, the description is to be regarded as illustrative in nature and not as restrictive.

The present disclosure relates to a pet chew product which combines one or more edible resins, such as starch, gluten, cellulose, rawhide and meat jerky into a woven chew toy. The rawhide, jerky, starch, gluten, etc. may be in the form of strips and may be at least partially or completely interwoven together. In addition, the starch, gluten, etc. and/or jerky may be partially or fully retained by the rawhide. The rawhide may provide an abrasive or flossing action while the pet is chewing on the chew toy and the starch, gluten, etc. and/or jerky may provide nutritional supplementation. The strips may also be a blend of rawhide with starch, gluten, etc. or a blend of jerky with starch, gluten, etc. which are interwoven.

"Strip" as used herein refers to an article having a length that is relatively greater in size than the width or thickness of the article, for instance 5-100 times greater.

"Interwoven" as used herein refers to a product formed by combining a plurality of strips of materials by weaving the strips together to form a planar article wherein the strips alternate to form a surface of the article. Accordingly, one strip of a first material may first pass over a first strip of a second material and then under a second or third, etc. strip of the second material. A second strip of the first material may first pass under a first strip of a second material and then over a second or third, etc. strip of the second material and so on to form a planar article. With interweaving, as distinct from braiding, a first strip engages a second strip only once, that is, the woven article comprises a first plurality of parallel strips which engage a second plurality of parallel strips at a given angle.

"Planar article" as used herein refers to an article having a front and a back surface that are relatively greater in dimension than the thickness of the article, such as 8-20 times greater.

Rawhide

The rawhide may be obtained from the hide of an animal such as buffalo, sheep, goats, marsupial, pig, deer, elk, or cattle, and amounts to an edible resin herein. The hide may not be exposed to tanning and may be devoid of all fur, meat and fat. Initially the hide may contain between 60 to 80% by weight water and 20 to 40% by weight other substances such as fibrous proteins, collagen, keratin, elastin and reticulin. Also, between 0.01 to 2% by weight ash may be present wherein the ash may include phosphorous, potassium, sodium, arsenic, magnesium and calcium.

Generally, a hide may be prepared by any method known to those of ordinary skill in the art. One such exemplary method may include removing most of the visible fat and meat from the hide. Once the fat and meat is removed the hide may be treated in a solution of calcium carbonate or calcium hydroxide, which may loosen and aid in the removal of hair. In addition, sodium sulfide, ammonium salts or enzymes may be added to the solution. The hair may then be removed from the hide and the hide may be rinsed. The hide may then be soaked in an aqueous solution including organic acids, inorganic acids and/or acid salts, such as potassium hydrogen tartrate and sodium bicarbonate. The hide may be rinsed again forming rawhide pieces, which may assume the shape of sheets. The pieces of rawhide may be dried or further processed wet. In addition, the pieces may be soaked in a solution including hydrogen peroxide and chlorine. The sheets of rawhide may then be cut into strips for weaving.

In an exemplary embodiment, the rawhide may be provided as a rawhide resin composition, wherein the rawhide may be chopped or ground into small particles or powder. The particle size may be less than about 10 mm, such as in the range of 0.001 to 10 mm, including all values and increments therein. The rawhide moisture content may be adjusted to approximately 1-20% by weight of the rawhide, including all increments and values therein, such at 8%, 10%, etc.

The rawhide may then be combined with up to 20% by weight of casein, such as in the range of about 0.1 to 20% by weight, including all values and increments therein. Casein may be understood as a phosphor-protein of milk, wherein a phosphor-protein may be described as a group of substances that are chemically bonded to a substance containing phosphoric acid. The rawhide may also be combined with gelatin up to 10% by weight, such as in the range of 0.1 to 10% by weight, including all values and increments therein. Gelatin may be understood as a protein product produced by partial hydrolysis of collagen. In addition, attractants, such as flavorants, or nutrients may be compounded with the rawhide.

The rawhide particles may be melt processed, wherein the particles are plasticated in a plasticating device. Suitable plasticating devices may include injection molding machines, extruders (twin-screw, single screw, etc.) or any other device which may provide sufficient thermal-mechanical interaction to cause plastication, such as blenders. The temperature of the plasticating device may be sufficient to melt at least 10% to 100% of the particles, including all values and increments therein and may be in the range of about 120 to 150° C., including all values and increments therein. In addition, the particles may be pressurized during plastication wherein the applied pressure may be in the range of about 1 to 20 MPa, including all values and increments therein. For example, back pressure may be applied during injection molding.

Once plasticated, the rawhide may be formed to a desired shape, such as strips, by an extruder die, an injection mold cavity, etc. It should be appreciated that the casein, gelatin and other additives, i.e. attractants, flavoring or nutrients, may be added to the rawhide prior to or during plastication. In addition, moisture may be removed from the rawhide during plastication or after plastication. For example, the plastication device may be vented, such as by the use of vent ports in the plastication device. After plastication, the moisture may be removed by drying, such as drying in an oven or tunnel.

Other Edible Resins

Edible resin may include any resin that may be consumed by an animal, such as, for instance, one or more of a starch, gluten, vegetable based protein, a carbohydrate or fat and mixtures thereof. Accordingly, an edible resin may contain a mixture of, e.g., starch, gluten, carbohydrate and/or a fat. For example, an edible resin may contain 25% (wt) starch, 25% (wt) gluten, 25% (wt) carbohydrate and 25% (wt) fat. However, any and all values of such components may be employed, wherein the components may be present in any value or range at about 1-99% (wt). Accordingly, such an edible resin may contain 50% (wt) gluten, 25% (wt) starch, 15% (wt) carbohydrate and 10% (wt) fat. It may also contain 75% (wt) gluten, with the remaining 25% (wt) distributed over the other identified edible sources. Those skilled in the art will therefore appreciate other potential values and ranges. Accordingly, any one of the ingredients (starch, gluten, vegetable based protein, fat) may be present as a major ingredient (50% (wt) or greater) and the other components may be present at less than 50% (wt).

As alluded to above, such an edible resin may include any starch or carbohydrate of natural or vegetable origin or gluten, such as wheat gluten. Exemplary starches may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassava, konjac, kudzu, oca, sago, sorghum, sweet potato, taro, yams, fava beans, lentils and peas. The starch may be present in the resin composition between about 30-99% including all increments and values therebetween such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, as described above, which may be understood as milled and/or pre-sifted. It should be understood that the raw starch may also have varying degrees of moisture present. In one embodiment, moisture may be present in the raw starch between 1-60%, including all increments and values therebetween such as 40%, 20%, 10%, etc. Accordingly, it should be appreciated that the term "direct" as used herein with respect to molding refers to the molding of resin (e.g. starch) without the resin having been exposed to prior thermal molding histories before injection molding (such as the formation of pellets). However, the resin (e.g. starch) herein may, e.g., be heated for drying purposes, which would not amount to a prior thermal molding history.

Gluten may be understood as water-insoluble protein complex extracted from cereal grains such as maize or corn and wheat. Accordingly, the present disclosure contemplates the use of a wheat gluten material either as the base resin or in combination with another edible resin, such as starch. The gluten may be composed of gliadin and glutenin. Again, as noted above, gluten may be present in the resin composition between about 1-99% including all increments and values therebetween, such as at levels above 50%.

The edible resin composition herein may be sourced from Manildra Group USA, under the following trade names: "GEMSTAR 100," which is a refined food grade wheat starch; "GEMSTAR100+," which is a refined food grade wheat starch; "GEM OF THE WEST VITAL WHEAT GLUTEN," which is a powder product produced by low temperature drying of gluten extracted from wheat flour; "ORGANIC GEM OF THE WEST VITAL WHEAT GLUTEN," which is a powder product produced by low temperature drying of gluten extracted from organic wheat flour; "ORGANIC GEMSTAR 100," which is a wheat starch extracted from organic wheat flour; and/or "ORGANIC GEMGEL 100," which is a pre-gelatinized organic wheat starch. In addition, the resin composition may be sourced from ADM under the trade names "EDIGEL 100," which is a wheat resin composition, and "AYTEX P," which is an unmodified food grade wheat starch.

The edible resin (e.g. starch or gluten) may be of a controlled particle size, and may have a controlled level of moisture, so that the resin may be formed, upon exposure to one cycle of heat, into a desired shape, such as a strip. The resin may have a particle size distribution wherein all or a portion of the particles are less than about 2.0 millimeters (mm), or 2000 microns, including all ranges of particle size that may be below 2000 microns. For example, the resin particle size may be less than about 500 microns and any value or range between 500 microns and 1 micron, including less than 250 microns, less than 149 microns, less than 44 microns, etc. In one embodiment, approximately greater than 95% of the particles are less than 149 microns and approximately greater than 60% of the particles are less than 44 microns. In another embodiment, approximately greater than 97% of the particles are less than 250 microns, and approximately greater than 75% of the particles are less than 149 microns. The resin may also have a bulk density of between 30-50 lb/cubic foot, including all values and ranges therebetween such as between 40-45 lb/cubic foot, 38-40 lb/cubic foot, 35-38 lb/cubic foot, etc.

The resin may also include or be based upon cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the resin composition. The emulsifier may be present between about 1-10% by weight of the resin composition and all increments or values therebetween including 3%, 4%, etc. The emulsifier may include, for example, lecithin, which may be extracted or derived from egg yolk or soy beans.

The resin composition may also include a plasticizer. The plasticizer may include for example, glycerin. The plasticizer may be incorporated between about 15-30% by weight, including all increments and values therebetween such as levels greater than 15%, 21%, 27% etc.

A humectant may also be incorporated into the resin composition. The humectant may include, for example, oat fiber. The humectant may be incorporated between about 0.1-5% by weight of the resin composition including all intervals and values therebetween, including 1%, 25%, etc. A humectant may be understood to be any additive that may absorb water in the material.

The resin composition may also include water. The water may be introduced into the composition between about 1-40% by weight of the resin composition and any increment or value therebetween, including 4%, 20-40%, 10-20%, etc. After the strip has been formed, the water may be present between 1-20% by weight of the resin composition including all increments or values therebetween, such as, below 20%, 4%, 5-10%, etc.

The resin composition may include a nutraceutical. The nutraceutical may be fermented soya. Fermented soya nutraceuticals are available from Bio Food, Ltd., Pine Brook, N.J. and sold under the general trademark Soynatto®. The fermented soya may be present between about 1-40% by weight of the resin composition, including all increments and values therebetween, including 10%, 20%, etc. The Soynatto® product may provide proteins, minerals, and vitamins, in a fermented soy form. The fermentation process may infuse the product with saccharomyces cerevisiae, commonly known as "bakers yeast" or "brewers yeast." Saccharomyces cerevisiae is more traditionally known to ferment sugars present in flour or dough, yielding carbon dioxide and alcohol. Accordingly, it should be appreciated that a protein, one or more of a mineral, and one or more of a vitamin, along with saccharomyces cerevisiae may be present in the resin composition.

The fermented soy product herein may also include increased concentrations of glycitein, daidzein and genistein, reportedly present at several hundred percent more than other more common soyfood sources. Glycitein, daidzein and genistein belong to the isoflavone class of flavanoids and may be classified as phytoestrogen, since they are plant derived nonsteriodal compounds that contain estrogen-like biological activity.

The resin composition may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

Reportedly, the coenzyme Q10 is a fat-soluble compound primarily synthesized by the body and also consumed in the diet and is required for mitochondrial ATP synthesis. The fermented coenzyme also reportedly belongs to the family of compounds known as ubiquinones, which are either of two isomeric cyclic crystalline compounds $C_6H_4O_2$ that are diketo derivatives of dihydro-benzene. It may also function as an antioxidant in cell membranes and lipoproteins.

Other additives may be introduced into the resin composition as well. These additives may include vegetable matter, fruit matter, rawhide, nuts, nut bits or nut flour such as peanut flour, and animal or fish products, by-products, meal or digests, etc. By animal digest it is understood to include a substance made by taking relatively clean and relatively undecomposed animal tissue and breaking it down utilizing chemical or enzymatic hydrolysis. Preferably, the animal digest is hydrolyzed liver, e.g., hydrolyzed poultry liver. The animal digests may be obtained from Applied Food Biotechnology Incorporated, O'Fallon, Mo., and sold under the trade name Optimizor®. These additives may be present individually or cumulatively between about 0.1-50% by weight of the resin composition and all increments and values therebetween including 0.1-5.0%, 15%, 25%, etc.

Additionally, flavorants, herbs, herbal extracts, vitamins, minerals, colorants, yeast products, soy products, attractants, etc., may be incorporated into the resin composition. Yeast products may include nutritional yeast or brewers yeast such as saccharomyces cerevisiae, dairy yeast such as *kluyveromyce marxianus* or wine yeast such as *saccharomyces fermentati*. The soy products may include fermented soy or other soy products, such as miso paste or tempeh. Attractants may include compounds listed herein, such as the animal or fish digests, or other compounds that may increase an animal's interest in the resin composition. These additives may be present individually or cumulatively between about 0.01-25% by weight of the resin composition and any increment or value therebetween including 0.01-0.5%, 10%, 20%, etc. The composition may also include calcium carbonate. The calcium carbonate may be present between about 5-10%.

The edible resin may be compounded by melt mixing or blending. Once compounded, the resin may be formed into a desired shape, such as a strip. It should be appreciated that the compounding and forming processes may occur in separate steps or at the same time. For example, the ingredients may be fed into an injection molding machine or into an extruder, mixed and plasticated through rotation of a screw and formed upon injection into a cavity or passage through an extruder die. In another embodiment, the ingredient may be fed into a twin screw extruder or a blender, compounded and formed through a die into the desired shape. In a further embodiment, the ingredients may be compounded in a blender or mixer and then the compounded resin may be fed into a molding machine, wherein it is plasticated.

In addition, moisture, including water, may be removed from the resin composition during processing. For example, a vented barrel may be provided in an extruder or injection molding machine. The moisture content may also be reduced by introducing the strip or sheet into an oven, dryer, cooling tunnel, etc. However, it should be appreciated that it may be desirable that the resin contain sufficient moisture to allow the resin to be formed into and with the rawhide and then once formed both the resin and rawhide may be dried.

Jerky

Jerky is a very popular form of meat product that may be stored for long periods of time without refrigeration and amounts to another edible resin. Meat is generally cut into thin strips with much of the fat trimmed off, then dried. Drying may take place in an oven at relatively low heat so that the product is not cooked, or may be dried by sun-drying. Salt and a preservative may also be added as well as a marinade. By keeping the moisture content relatively low, spoilage may be prevented as microorganism growth may be slowed, particularly if stored in air tight packaging. Accordingly, a meat jerky herein may be understood as a meat that has been previously dried to a moisture content of less than about 40% (wt.), including all values and increments in the range 0.1%-40% (wt.).

Many types of meat may be "jerked" including but not limited to chicken, beef, venison, lamb, fish (for instance, tuna and salmon), pork, turkey, duck, alligator, ostrich, buffalo, pheasant, rabbit, veal and elk.

Combining such jerky strips into animal chews and chew toys may provide a greater variety of tasty experiences for pets. Generally, such meat products may be provided to add nutritional value and not just flavoring.

The meat jerky may be woven in strip form (pulled) or be combined with the edible resin by melt processing as described below.

Edible Resins Blended with Jerky

Preferably, the edible resins may be selected from a material that is capable of flow due to heat and which may be due to heating above an indicated glass transition temperature (Tg) or melting point (Tm). In addition, the resin may be one that provides a molecular weight and/or melt viscosity that allows for the meat jerky (which may remain in a relatively solid particle form) to be relatively uniformly dispersed in the resin during processing (e.g. extrusion or injection molding). The resin may also have an identifiable repeating unit characteristic of a polymer rein.

Accordingly, the edible resin may be selected as noted above from the group consisting of starch, gluten, soy, rice, potato, casein, denatured and partially hydrolyzed collagen, thermoplastic polymers and mixtures thereof, as noted above Thermoplastic polymers include polymers such as polyamides and polyurethanes, as well as ethylene copolymers, such as poly(ethylene acrylic acid) and poly(ethylene vinyl alcohol).

By way of representative example, in the case of starch, e.g., the process herein may rely upon combining starch with water and a meat jerky to form a mixture such that the mixture is made suitable for melt processing using known plastic processing techniques. In that regard, attention is directed at commonly owned U.S. Pat. No. 6,159,516, whose teachings are incorporated by reference. The process herein may therefore make use of such melt processing techniques and comprises combining starch, meat jerky and water wherein the water content may initially be in the range of greater than about 25%, e.g. in the range of greater than 25% to about 40.0% by weight, introducing and heating said mixture in an extruder wherein the water content of the extrudate upon discharge from said extruder is less than the water content of the composition entering said extruder, and cooling to form the resin/jerky strip wherein the water content is at or below about 25% by weight.

According to the present disclosure, a meat jerky product, such as chicken, may be combined with the resin and water in the extruder and still processed to form a moldable composition such as a strip. Furthermore, the meat jerky component may comprise about 1 to about 90% (wt) of the molded composition, including all values and increments therein. It is also contemplated that the jerky content will be relatively uniformly and homogenously distributed throughout the molded composition. Toward such end, it is contemplated herein that the meat jerky may be present as a plurality of particles having a maximum average cross-sectional diameter of less than or equal to about 0.25 inches including all values and increments therein. For example, the meat jerky particles may have a maximum average cross-sectional diameter of less than or equal to about 0.10 inches, or less than or equal to about 0.005 inches, etc.

The meat jerky may also include a mixture of meat products (e.g. chicken and beef jerky). In such a situation the amount of each jerky component may be varied between 0.1-99%, including all values and increments therein.

Accordingly, in connection with the above preferred process, vitamins, minerals and/or herbs may be added with the starch and water prior to extrusion, or may optionally be combined with the starch at that point wherein the starch is to be introduced into, e.g., the molding machine for molding, along with the jerky. It is therefore worth noting that in the context of the present disclosure, it has been appreciated that the vitamins, minerals and/or herb additives herein can be molded in the starch/water mixture without substantial thermal degradation of such additives which degradation may attenuate or eliminate their therapeutic effect. In the context of the present disclosure, it is therefore preferable that at least some portion of the additives remain non-degraded. Those skilled in the art will therefore recognize that in the case of the additives herein, levels as low as 50 ppm would be suitable, including levels between about 50 ppm-1000 ppm, as well as all values and increments therein.

In addition to processing at such temperatures that additives may not be significantly degraded, this process provides a means for providing a strip containing a meat product wherein the strip may have a controlled amount of moisture such that the strip may be stored, preferably in air tight packaging, for long periods of time without significant spoilage. This approach then allows such meat products and additives to be distributed in a chew toy and in a preserved state such that their nutritional or therapeutic value may be maintained.

Accordingly, by incorporating the aforementioned meat jerky and additives in a resin/fluid (e.g., starch/water) combination, the disclosure herein expands upon the use of water to promote melt mixing of such materials with the starch without significant thermal degradation during plastication (softening for use in a melt-processing operation) in either the extrusion or injection molding equipment. Those skilled in the art will therefore recognize that the amount of water can be readily varied as may be necessary to allow for lower melt processing temperatures to minimize thermal degradation and to provide a strip with a controlled amount of water. Preferably, however, the level of added water upon introduction to the extruder may be set at about 20-40% by weight with respect to that of the starch, which may emerge from the extruder at a level of about 15-20% water by weight, at which point the extrudate may be in condition for the step of interweaving. Following interweaving, the water level may be set to about 5-20% by weight, and more preferably, 5-15%, and in a most preferred embodiment, the water level of the strip (including the jerky) may be set to about 11-14%.

Preferably, the strips of the present disclosure contain one or more of those vitamins recommended for dogs by the American Association of Feed Control Officials (AAFCO). In the case of dogs, vitamins may comprise A, C, $B_{12}$, D, E, thiamine, riboflavin, pantothenic acid, niacin, pyridoxine, folic acid and choline. In the case of cats, the vitamins may comprise vitamins A, C, $B_{12}$ D, E, and K, thiamine, riboflavin, pyridoxine, niacin, pantothenic acid, folic acid, biotin and choline.

In a preferred embodiment, the strips herein may contain vitamins available in the nutraceutical of fermented soya which is made available from Bio Foods, Ltd., Pine Brook, N.J. and sold under the general trademark SOYNATTO, and more specifically SOYNATTO F614 and F625. Preferably, the fermented soya may be present between 0.1-20% (wt.), including all incremental values therebetween with respect to such ranges. In addition, reference is made herein to U.S. Pat. No. 7,332,188, entitled "Animal Chew Containing Fermented Soyfood" whose teachings are incorporated herein by reference.

In addition, the strips of the present disclosure may also include minerals. In the case of dogs, the preferred minerals are calcium, phosphorus, potassium, sodium, chloride, magnesium, iron, copper, manganese, zinc, iodine, selenium. However, it is to be noted that other trace minerals have been suggested, such as Co, Mo, Cd, As, Si, V, Ni, Pb and Sn. Furthermore, minerals such as potassium, calcium, phosphorous and magnesium may be required in gram amounts/day, whereas iron, zinc, copper, iodine, and selenium are only required in mg or μg/day. The chew toy herein can therefore be modified to reflect a higher or lower concentration of a given mineral, according to nutritional requirements.

Turning next to the herbal component, the herbs may be selected from the group consisting of St. Johns Wort, Kava Kava, Ginkgo Biloba, Ginseng (Asian or Siberian varieties), Echinacea and mixtures thereof. Other herbs include Catsclaw, Camomile, Golden Seal, Saw Palmetto, Valerina, V. Agnus-Castus, Black Cohosh, Bilberry and Milk Thistle. Herbs may also include aloe, astragalus, burdock, chestnut, coriolus, versicolor, couchgrass, crampbark, dandelion root, dong quai, elecampane, evening primrose, eyebright, false unicorm root, feverfew, garlic ginger, goldenseal, gota kola, grape seed extract, green tea, guggulipid, hawthorn, hops, ivy, licorice, milk thistle, mistletoe (American Asian and European varieties), motherwort, oats, osha, passion flower, pumpkin pygeum, red clover, rosemary, sarsaparilla, skullcap, saw palmetto, stinging nettle, wild indigo, wild yam and yerba mansa. In addition, glucosamines and/or chondroitin can be added to any of the embodiments described herein.

Turning next to a consideration of the incorporation of the vitamins/minerals and/or herb additives of the present disclosure, it is preferable that such additives may be incorporated at the surface of the strip, so that they are delivered to the animal prior to the animal's initial loss of interest in the chew toy at issue. In such regard, the present disclosure contemplates several methods to selectively locate such additives at the surface of the strip. First, such additives may be selectively concentrated at the surface by a post-molding operation wherein the additives are incorporated into a soaking solution and are allowed to coat and/or penetrate the strip or woven chew toy. Preferably, a water solution containing the vitamins/minerals and/or herbs may be employed.

Further, the present disclosure contemplates the process of co-injection or insert molding, which allows multiple resins to be injected or extruded adjacent one another or in one mold to make a strip. In that regard, a starch/jerky formulation without vitamins/minerals and/or herbs may serve as the core of the strip and a starch/jerky formulation with said vitamins/minerals and/or herbs may serve as the outer molded surface. The thickness of either the core or surface layer can then be varied according to any desired level.

With reference to such technique of co-injection, it can be appreciated that this uniquely allows for the injection molding of a resin (e.g. starch) outer layer with additives (vitamin, mineral, herb) under conditions wherein the water level may be higher than that of the core of the strip. For example, the outer layer formulation may comprise water levels, prior to injection molding of between 10-20%, preferably 15-20%, wherein a starch/jerky mixture for the core is made to contain water levels that are lower than any level selected for the outer layer. This feature of co-injection may therefore provide the ability to control a hardness gradient through the cross-section of the strip, with a relatively softer outer surface (e.g. lower Shore Hardness) to a relatively harder inner portion (e.g. higher Shore Hardness), or vice versa.

In one particularly preferred process of manufacturing the strips herein, starch, meat jerky and water may be first combined wherein the water content is in the range of 20 to about 40% by weight with respect to that of said starch/jerky. The mixture may be introduced into a vented barrel extruder to form an extrudate which may be reduced in size for further processing, wherein the water content upon discharge from the extruder is less than the water content of said mixture entering the extruder. This extrudate may be in the form of a strip or a sheet which may be cut into strips.

In another exemplary embodiment of the present invention, the strips of the present disclosure, including one or more meat jerky materials, may be formed by the direct injection molding of the meat jerky. The meat jerky may specifically be a meat jerky that has not been itself exposed to a prior thermal treatment for the purpose of providing a strip. That is, while the meat jerky may have been heated for drying purposes, and granulated or pelletized, it may represent meat jerky herein that still has not been exposed to a heated/molding type environment that may be found in an extruder or injection molding type machine, and may therefore be understood herein as virgin meat jerky. Accordingly, the meat jerky may again be such that it has an average diameter of less than or equal to about 0.25", including all values and increments therein. In addition, for the direct injection molding contemplated herein, the meat jerky may again be combined with resin and a fluid as noted above. Accordingly, the meat jerky herein may be directly injection molded accordingly to the process disclosed in U.S. application Ser. No. 11/198,881, which is assigned to the assignee of the present invention and included by reference herein in its entirety. As may therefore be appreciated, the jerky, or the starch, water and jerky may be introduced directly into the barrel of an injection molding machine and mixed therein to form a composition, foregoing the need to, e.g. mix the ingredients in an extruder and formed into a strip.

One exemplary composition for direct injection molding of a molded strip may comprise chicken jerky, cellulose/oat fiber, a plasticizer such as glycerin, an emulsifier such as lecithin, and optionally, additives such as vitamins, minerals, omega fatty acids, and flavorants. A resin such as starch may also be present at levels above about 50% (wt.) including all values and increments between 50-99% (wt.). In addition, the plasticizer may be present at about 15% and the emulsifier at levels about 10%.

In another exemplary embodiment of the present invention, a mixture of starch, water and meat jerky may be introduced to a screw conveyor which may be heated. The screw conveyor, which may be an auger type conveyor, may therefore serve to further mix the base components and when heated, as applied to a mixture containing liquid, operates to increase the composition to an overall higher solids level, or stated another way, to a lower moisture level, in connection with those mixtures that contain moisture. It should be noted that the preferred screw/auger type conveyor does not contain a die nor does it develop pressure within a barrel as in conventional extrusion. Furthermore, in the case of a binder that binds the base components in the absence of heat, the screw conveyor may redistribute the binder within the base components so that more effective binding may take place.

Accordingly, the output of the screw conveyor is then fed onto rollers, which may be temperature regulated, which rollers serve to form a sheet material. In that regard, it can be appreciated that the output may be introduced to two opposed rollers at the location of their circumferential surfaces. As noted, the rollers may optionally be heated or cooled, and each roller may be set to different temperatures and optionally contain a polished or non-stick type surface. Depending upon the spacing between the rollers, the sheet of material produced may be formed with a thickness that corresponds to the spacing between the rollers. The rollers therefore serve to press the blended base components into sheet form and the rollers may optionally be cooled to facilitate such sheet formation. In addition, the rollers themselves may optionally contain grooves and ridges, such that the ridges of one roller enter into the grooves of an opposing roller, thereby providing a cavity to form a ribbon or strip of material. Therefore, the depth of engagement of the ridge into the groove will itself allow one to select the desired thickness for a ribbon of material to be produced, and ultimately cut the sheet into final shape. The material so formed of any particular desired thickness may be delivered to a thermo-regulated chamber, preferably a tunnel, which partially or completely surrounds the sheet or strips and which may provide uniform heating. Accordingly, after the mixture has been shaped and rough sized by the roll mill, the resulting sheet may be discharged from the roll mill onto a conveyor which feeds into the thermo-regulated chamber. Optionally, the conveyor may be chilled to assist in further cooling the sheet prior to further thermo-regulation.

Passing through the aforementioned temperature controlled tunnel may therefore, among other things, serve to additionally harden the composition. In that context, the temperature of the tunnel may be adjusted depending upon the particular final solids level that one may desire, as the temperature of the tunnel serves to further remove liquid, such as moisture, thereby adding to the rigidity of the sheet or strips that are formed. Accordingly, the temperature of the tunnel and the length of time in the tunnel can be conveniently adjusted, depending upon the base components, and the desired moisture level one may wish to achieve in the strip. In addition, the tunnel may serve to provide cooling for a given selective composition.

The next step of the process may involve cutting to a final desired shape. This can be accomplished in several ways. First, with the objective of forming an elongated strip, one can initially cut the sheet output along one axis such that the width of the bar is set. Then, a second cutter can be employed to set the length. Alternatively, this may be done in opposite order, or simultaneously. Suitable cutting and forming techniques may include water-jet cutting, hot knife, stamping, etc.

In accordance with the present invention, it has been found that it is possible to mix denatured and partially hydrolyzed collagen with meat jerky and another resin, such as casein, starch, vegetable matter, comminuted rawhide, or a synthetic polymer resin, such as a thermoplastic resin, including polyamides and or polyurethanes, as well as ethylene copolymers, such as poly(ethylene acrylic acid) and/or poly(ethylene vinyl alcohol). In such regard, the mixture has been found to lend itself to melt processing under pressure, which includes extrusion, injection molding and/or compression molding techniques. Accordingly, one can prepare strips for weaving herein, comprising meat jerky and denatured and partially hydrolyzed collagen, as well as molded strips that combine such collagen with the various components noted above.

Edible Resins Blended with Rawhide

The edible resin and rawhide may be compounded together by melt mixing or blending. Once compounded, the blend may be formed into a desired shape, such as a sheet or strips. It should be appreciated that the compounding and forming processes may occur in separate steps or at the same time. For example, the ingredients may be fed into an injection molding machine or into an extruder, mixed and plasticated through rotation of a screw and formed upon injection into a cavity or passage through an extruder die. In another embodiment, the ingredient may be fed into a twin screw extruder or a blender, compounded and formed through a die into the strip shape. In a further embodiment, the ingredients may be compounded in a blender or mixer and then the compounded resin may be fed into a molding machine, wherein it is plasticated.

In addition, moisture, including water, may be removed from the resin/rawhide composition during processing. For example, a vented barrel may be provided in an extruder or injection molding machine. The moisture content may also be reduced by introducing the strip into an oven, dryer, cooling tunnel, etc. However, it should be appreciated that it may be desirable that the resin contain sufficient moisture to allow the resin to be formed into and with the rawhide and then once formed both the resin and rawhide may be dried.

In one exemplary embodiment, a starch composition and rawhide may be blended and extruded or injection molded together to form what may be described as a composite strip. In this situation, the rawhide and edible resin may be present at respective levels of 1-99% (wt) and 99-1% (wt). In addition, the concentration of any of the above referenced additives, such as the nutritional additives, may be varied as desired to provide a desired level of nutritional supplementation. In one exemplary embodiment, the starch and the rawhide resin composition may be blended and injection molded or extruded together to form what may be described as a composite strip. In this situation, the rawhide and starch may be present at respective levels of 1-99% (wt) and 99-1% (wt). In addition, the concentration of any of the above referenced additives, such as the nutritional additives, may be varied as desired to provide a desired level of nutritional supplementation.

In addition, the starch composition may be molded, e.g. injection molded or over extruded or over-molded directly onto rawhide to form a strip. In this manner it is contemplated that the starch composition may be made to assume the shape of the rawhide as an outer layer which may partially or complete surround the rawhide and/or cover the rawhide at any selected location.

Such processes may be understood to include over-molding via injection molding. It should also be appreciated that in over-injection molding or over-extrusion the resins may be formed simultaneously or sequentially.

For an over-extruded strip, the first resin may be rawhide and a second resin may be a starch composition as contemplated herein. The resin melt flows may be joined together in a single extruder die or the flows may be joined once the resins have exited separate extruder dies. In addition, a first formed resin may be provided and the second resin may be extruded over the first formed resin, as alluded to above. Once again, the first resin may be either a starch composition or rawhide resin and the second resin may be either a starch composition or rawhide.

In an exemplary embodiment, the strips of starch, gluten, rawhide, jerky, edible resin/jerky blend and/or edible resin/rawhide blend may be interwoven into a chew toy for animals. It is contemplated that such woven chew toy may comprise any one or any combination of all of the compositions of strips noted above. That is, the chew toy may be woven of starch, gluten, etc. edible resins or of rawhide or of jerky or any combination thereof.

FIG. 1 is a first exemplary embodiment of an interwoven pet chew 10 according to the present disclosure, a plurality of strips of a first material 12, such as a starch or gluten edible resin as described herein in strip form has been interwoven with a plurality of strips of a second material 14, such as strips of rawhide. In weaving fashion a strip of the first material 12 is alternately passed over and then under strips of the second material 14 to form the woven chew. The plurality of strips of each material 12 (shown as having a stipple appearance for clarity) or 14 may run parallel to one another as they intersect with the second material. Such intersection of a first plurality of strips 12 and a second plurality of strips 14 may occur generally at right angles to one another, the individual strips 12 alternately passing first over and then under one or more of the plurality of strips 14.

While FIG. 1 illustrates a single strip intersecting the next single strip, it is contemplated that the weaving may take place with a pair of strips rather than a single strip that is, two strips alternately passing over and under two strips of a second material. The woven chew toy 10 may also include points or regions of attachment 16 to provide integrity to the chew 10. Such points or regions of attachment may include single stitches, such as with rawhide thread or lacing positioned at intersection points of the first and second material or may include melting of one of the materials into the other, such as by heat staking, vibration welding, laser welding, etc. It is contemplated that the points or regions of attachment 16 may provide a bond strength between contacting surfaces that is greater than the tensile strength of the strips 12 and/or 14. It is also contemplated that the bond strength between contacting surfaces may be made to exceed only the tensile strength of one of the strips 12 or 14, such that when chewed upon by an animal, one of the strips may be selectively configured to be removed from the woven chew toy 10.

It is further contemplated that the interwoven chew troy of the present disclosure may be held together by the frictional characteristics of the individual strips, particularly given the rather abrasive surface due to the fibrous nature of the rawhide and its relative stiffness. It is further contemplated that the ends of the individual strips may be wrapped under the edges of the woven chew toy and attached thereto as described above.

Figure 2:
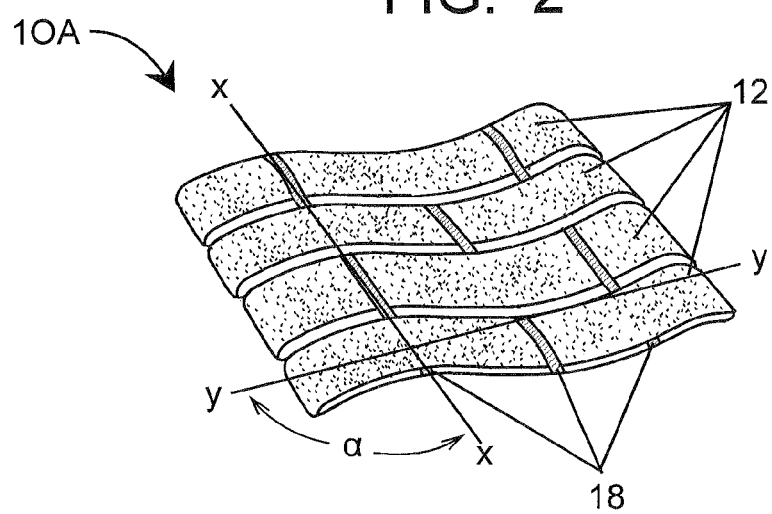
FIG. 2 is an exemplary embodiment of a second interwoven pet chew according to the present disclosure.

FIG. 2 is another exemplary embodiment of an interwoven pet chew 10A according to the present disclosure, illustrating strips 12 and 18 (shown as having a wavy surface for clarity) having different widths which are woven together. In this embodiment, a third material 18 such as a meat jerky may be interwoven with a first material 12 to form a woven chew toy 10A.

The width of the strips 12, 14, 18 may be in the range of about 5 mm to 50 mm, in any numerical increment, such as 1 mm increments. For instance, 5 mm, 6 mm, 7 mm, 8 mm etc. Such width, as discussed herein, may serve as the width of the melt bonding that occurs between strips. In that regard, relatively high area bonding is achieved for a given woven chew herein. Furthermore, it may be advantageous in certain interwoven chews to have some strips melted bonded at 16 and other strips that are not melt bonded where the strips overlap one another.

It is contemplated that the woven chew toy may have overall dimensions of about 3-25 mm in thickness and between about 6 and 415 $cm^2$ in area. It is further contemplated that the number of strips running parallel in a plane may be from 2 to 100.

FIG. 2 also indicates an x-axis and a y-axis for the edges of the chew and while the strips for each plane run generally in parallel, the strips may run at a diagonal to the axes or the edges, and at any angle α from 45-90°.

Figure 3:
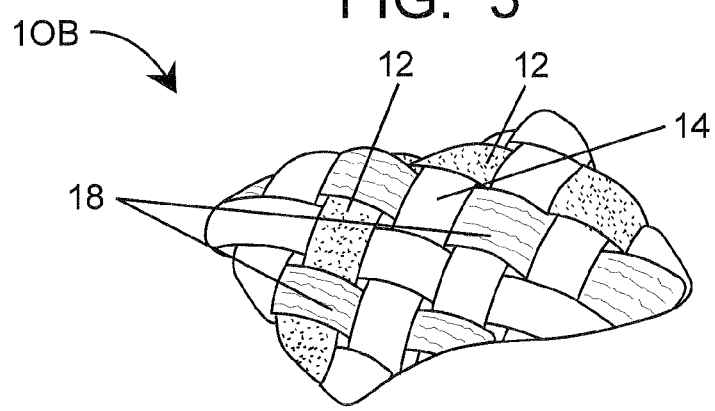
FIG. 3 is an exemplary embodiment of a third interwoven pet chew according to the present disclosure.

FIG. 3 is another exemplary embodiment of an interwoven pet chew 10B according to the present disclosure, illustrating the weaving of three materials 12, 14, 18 at an angle to the main axes of the chew. As noted above, it is contemplated that any one or more of strips of starch, gluten etc. edible resins and/or rawhide and/or jerky and/or resin/jerky blend and/or edible resin/rawhide blend may be interwoven into a chew toy for animals.

Figure 4:
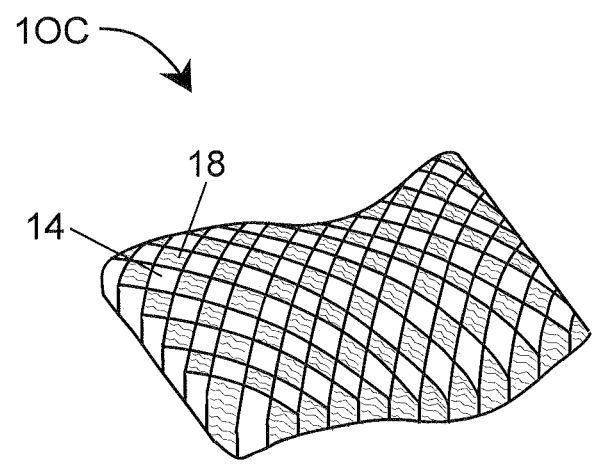
FIG. 4 is an exemplary embodiment of a fourth interwoven pet chew according to the present disclosure.

FIG. 4 is another exemplary embodiment of an interwoven pet chew 10C according to the present disclosure illustrating the second 14 and third 18 materials of equal but intermediate width interwoven to form a chew toy.

Figure 5:
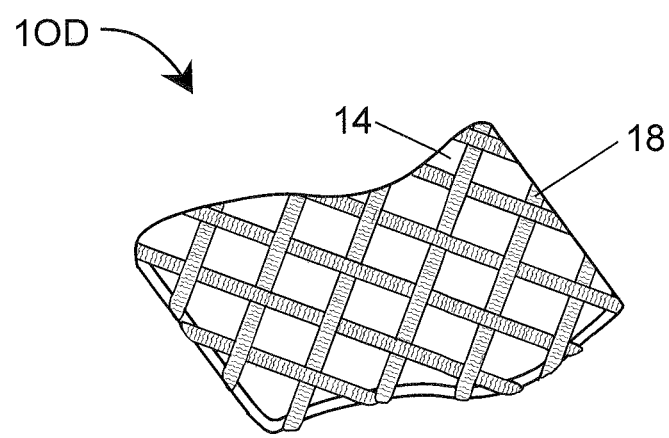
FIG. 5 is an exemplary embodiment of a fifth interwoven pet chew according to the present disclosure.

FIG. 5 is another exemplary embodiment of an interwoven pet chew 10D according to the present disclosure wherein the third material 18 is interwoven with itself and such weave covers the sides of a second material 14. Accordingly, second material 14 may be selected and encased in such a manner and configured to separately attract an animal or provide a separate source of nutrition.

It is further contemplated that two woven chews may be attached together by interweaving the two chews as layers, the interweaving providing the mechanism for attachment so that thicker chews may be provided.

The method for interweaving the strips of various compositions may be manual wherein the strips are intersected by hand to form the chew of the desired size, alternating strips of a first material over and under strips of the same or a different material. Large sheets of the interwoven strips may be formed and then cut to a desired size and shape (by die cutting, water jet cutting, laser, etc.) or the strips may be woven to the desired size.

In another method, the starch, gluten, etc. compositions and the rawhide resin may be separately extruded and their extrudates woven together to form a chew before the resins harden, i.e. before the resins are dried. This may be done by employing multiple extruder dies in parallel (from one or a plurality of extruders) for the starch, gluten, etc. resins, for instance, and configuring a second set of multiple dies and a second extruder for the rawhide such that the extrudates from the second set of dies may be alternately passed over and under the first set of extrudates, preferably at an angle of 45 to 90°.

It should be appreciated that more than two strips may be used to form the chew. In addition, in the case of multiple strands, any one or a plurality may be made of the for instance, starch, gluten, etc. compositions, and any one or a plurality may be made from rawhide, and any one or a plurality may be made from meat jerky.

The foregoing description is provided to illustrate and explain the present disclosure. However, the description hereinabove should not be considered to limit the scope of the disclosure set forth in the claims appended here to.

What is claimed is:

1. A method of making a chew toy of interwoven strips of one or more of edible resins, comprising;
   providing a first edible resin material and a second edible resin material;
   providing at least a first extruder having a first plurality of dies and a second extruder having a second plurality of dies;
   charging said first edible resin material into said first extruder and said second edible resin material into said second extruder; and
   extruding said first edible resin material through said first plurality of dies and extruding said second edible resin material through said second plurality of dies to form a first plurality of strips and a second plurality of strips; wherein:
   said first plurality of strips are configured in parallel fashion to each other in a first plane;
   said second plurality of strips are configured in parallel fashion to each other in a second plane; and
   the method further comprises interweaving said first plurality of strips and said second plurality of strips into a planar article by passing said first plurality of strips through said second plurality of strips in alternating fashion such that one or more of said first plurality of strips passes first over and then under one or more of said second plurality of strips.

2. The method of claim 1, wherein said first edible resin material and said second edible resin material are of the same composition.

3. The method of claim 2, wherein said one or more edible resins comprises at least one of a melt blend of starch and rawhide, and a melt blend of starch and meat jerky.

4. The method of claim 1, wherein said first and second edible resins comprise one or more of rawhide, meat jerky, starch and combinations thereof.

5. The method of claim 1, wherein said chew toy comprises at least one edge, wherein said first plant and said second plane intersect at a plane of intersection, said plane of intersection having an angle that is different than an angle of said at least one edge.

6. The method of claim 1, wherein said chew toy includes moisture and said moisture is present at below 20% by weight of the chew.

7. The method of claim 1, further comprising joining said first and second strips together at one or more intersections by melting a portion of at least one of the first plurality of strips and the second plurality of strips.

* * * * *